United States Patent
Luschi et al.

(10) Patent No.: US 9,184,785 B2
(45) Date of Patent: *Nov. 10, 2015

(54) CELLULAR COMMUNICATIONS SYSTEM

(75) Inventors: Carlo Luschi, Oxford (GB); Simon Nicholas Walker, Bristol (GB)

(73) Assignee: Icera Inc., Wilmington, DE (US)

( * ) Notice: Subject to any disclaimer, the term of this patent is extended or adjusted under 35 U.S.C. 154(b) by 134 days.

This patent is subject to a terminal disclaimer.

(21) Appl. No.: 13/575,005

(22) PCT Filed: Jan. 27, 2011

(86) PCT No.: PCT/EP2011/051164
§ 371 (c)(1),
(2), (4) Date: Jul. 24, 2012

(87) PCT Pub. No.: WO2011/092257
PCT Pub. Date: Aug. 4, 2011

(65) Prior Publication Data
US 2012/0300765 A1    Nov. 29, 2012

(30) Foreign Application Priority Data
Jan. 29, 2010  (GB) .................................. 1001482.7

(51) Int. Cl.
*H04Q 7/00* (2006.01)
*H04B 1/707* (2011.01)
*H04J 11/00* (2006.01)
*H04L 25/03* (2006.01)

(52) U.S. Cl.
CPC .............. *H04B 1/707* (2013.01); *H04J 11/005* (2013.01); *H04B 2201/7071* (2013.01); *H04B 2201/70702* (2013.01); *H04L 2025/03726* (2013.01)

(58) Field of Classification Search
None
See application file for complete search history.

(56) References Cited

U.S. PATENT DOCUMENTS

| | | | |
|---|---|---|---|
| 7,933,346 B2 | 4/2011 | Yin et al. | |
| 8,576,733 B2 * | 11/2013 | Attar et al. | 370/252 |
| 8,682,272 B2 | 3/2014 | Luschi et al. | |
| 2002/0044614 A1 * | 4/2002 | Molnar et al. | 375/346 |
| 2002/0051433 A1 * | 5/2002 | Affes et al. | 370/335 |
| 2006/0153283 A1 * | 7/2006 | Scharf et al. | 375/148 |
| 2009/0023392 A1 | 1/2009 | Iizuka et al. | |
| 2010/0008244 A1 | 1/2010 | Sampath et al. | |

FOREIGN PATENT DOCUMENTS

| | | |
|---|---|---|
| EP | 1921757 A1 | 5/2008 |
| TW | 200640177 | 11/2006 |
| TW | 200832994 A | 8/2008 |
| TW | 200931897 A | 7/2009 |

(Continued)

OTHER PUBLICATIONS

Taiwan office action dated Sep. 15, 2014, 3 pages.

*Primary Examiner* — Duc C Ho (57) ABSTRACT

A method, receiver and program for processing a signal received using a wireless communication channel by a receiver in a wireless cellular network. The method comprises: receiving signal samples of a signal to be processed from a serving cell; identifying a set of dominant interfering cells generating an interfering signal above a level; using the number of cells in the set to select an interference scenario; and using the selected interference scenario and at least one parameter related to the serving cell and the interfering cells to select a processing function for processing the signal.

19 Claims, 6 Drawing Sheets

(56) References Cited

FOREIGN PATENT DOCUMENTS

| | | |
|---|---|---|
| TW | I316340 B | 10/2009 |
| WO | 9908460 A2 | 2/1999 |
| WO | 0223742 A2 | 3/2002 |
| WO | 2007091908 A1 | 8/2007 |
| WO | 2011092257 A1 | 8/2011 |

* cited by examiner

CELLULAR COMMUNICATIONS SYSTEM

CROSS-REFERENCE TO RELATED APPLICATION

This application is the National Stage of, and therefore claims the benefit of, International Application No. PCT/EP2011/051164 filed on Jan. 27, 2011, entitled "A CELLULAR COMMUNICATIONS SYSTEM," which was published in English under International Publication Number WO 2011/092257 A1 on Aug. 4, 2011, and claims priority from GB 1001482.7 filed on Jan. 29, 2010. Both of the above applications are commonly assigned with this National Stage application and are incorporated herein by reference in their entirety.

TECHNICAL FIELD

This invention relates to a cellular communications system and particularly but not exclusively to a wideband Code Division Multiple Access (WCDMA)/High Speed Downlist Packet Access (HSDPA) System.

BACKGROUND

As is well-known, a cellular communications system includes mobile radio receiver devices which can communicate with each other via base stations in the system. The system is set up as a cellular network, with each base station serving one or more cells depending on the cell structure. The mobile radio receiver devices include analog radio frequency (RF)/intermediate frequency (IF) stages which are arranged to receive and transmit wireless signals carrying data via one or more antennas. The output of the RF/IF stages is typically converted to baseband, where an analog to digital converter (ADC) converts incoming analogue signals to digital samples, which are then processed for signal detection and decoding of the data, e.g. in the form of logical values. The analog to digital converter may alternatively operate directly at IF, in which case the conversion to baseband is performed in the digital domain. A number of different types of front end processing of the digital samples are known to implement signal detection, including rake receiver processing and channel equalisation processing.

In code division multiple access wireless systems, different physical channels are multiplexed in the code domain using separate spreading sequences. In the case of orthogonal spreading code words, the original data symbols can then be effectively separated at the receiver by despreading. In a wideband CDMA (WCDMA) cellular system, downlink code multiplexing is performed using orthogonal variable spreading factor (OVSF) codes. However, the OVSF code words are orthogonal to each other only under the condition of perfect time alignment. In the presence of multi-path propagation, the code orthogonality is lost and the operation of despreading is effected by multiple access interference (MAI).

Conventional CDMA receivers based on rake processing (as described for example in J. G. Proakis, "Digital Communications", published by McGraw & Hill, 1995) are subject to performance degradation due to loss of orthogonality between channelisation codes in the presence of multi-path propagation. For synchronous CDMA transmission, as in the case of the forward link of the third generation partnership project (3GPP) WCDMA standard, an effective approach to solve this problem is to use a chip level channel equaliser (for example as described in the paper by A. Klein "Data Detection Algorithms Specially Designed for the Downlink of CDMA Mobile Radio Systems", in Proceedings of IEEE Vehicular Technology Conference, vol. 1, Phoenix, Ariz., May 1997, pp. 203-207). The use of channel equalisation processing generally produces a significant performance advantage over conventional rake processing, but at the cost of an increased implementation complexity.

The performance advantage provided by chip level equalisation is especially important for high data rate transmission, as in the case of the 3GPP high speed downlink packet access (HSDPA) standard.

Chip level equalisers for HSDPA receivers are typically linear equalisers based on a transversal filter structure.

The computation of the equaliser coefficients for implementing equaliser processing can be based on the Minimization of the Mean-Square Error (MMSE) at the equaliser output. In principle, this can be achieved by block processing, as mentioned for example in A. Klein, "Data Detection Algorithms Specially Designed for the Downlink of CDMA Mobile Radio Systems", in Proceedings of IEEE Vehicular Technology Conference, vol. 1, Phoenix, Ariz., May 1997, pp. 203-207, or by means of an adaptive algorithm, as mentioned in K. Hooli, M. Latva-aho and M. Juntti, "Performance Evaluation of Adaptive Chip-Level Channel Equalisers in WCDMA Downlink", in Proceedings of IEEE International Conference on Communications, vol. 6, Helsinki, Finland, June 2001, pp. 1974-1979.

With respect to the calculation of the equaliser coefficients, the conventional MMSE criterion has the disadvantage of relying on specific assumptions on the statistics of the input disturbance (noise-plus-interference). An HSDPA MMSE equaliser typically assumes that the inter-cell interference can be modelled as an Additive White Gaussian Noise (AWGN) process. From this point of view, a more robust approach is to compute the equaliser coefficients based the Least-Squares (LS) criterion, where the calculation of the equaliser coefficients relies directly on the sample statistics of the input signal, without making any assumption on the statistics of the interference, as discussed, for example, in S. Haykin, *Adaptive Filter Theory*, Upper Saddle River, N.J.: Prentice Hall, 2001.

For both MMSE and LS equaliser, the processing relies on input signal samples collected from a suitable time interval, which should be selected in order to realize the best trade-off between the conflicting requirements of reducing the estimation errors by averaging over a wider time window, and of tracking the time variations of the propagation channel by averaging over a narrower time window for higher mobile speed.

International Application Publication No. WO 2009/0565505 discloses selecting a specific equaliser implementation based on different channel conditions, for example, on estimates of cell geometry and Doppler frequency. A particular method of performing cell geometry for this purpose is recited in International Application Publication No. WO 2009/056503.

SUMMARY

An aim of the present invention is to provide a robust interference scenario selection mechanism which can be used to more accurately adapt wireless receivers to certain channel environments.

According to one aspect of the present invention, there is provided a method of processing a signal received using a wireless communication channel by a receiver in a wireless cellular network, the method comprising:

receiving signal samples of a signal to be processed from a serving cell;

identifying a set of dominant interfering cells generating an interfering signal above a level;

using the number of cells in the set to select an interference scenario; and using the selected interference scenario and at least one parameter related to the serving cell and the interfering cells to select a processing function for processing the signal.

Another aspect of the present invention provides a receiver for use in a wireless cellular network for processing digital samples, the receiver comprising:

means for receiving signal samples;

means for identifying a set of dominant interfering cells generating an interfering signal above a level;

means for selecting an interference scenario using the number of cells in the set; and means for selecting a processing function for processing the digital samples based on the selected interference scenario and at least one parameter related to the serving cell and the interfering cells.

The invention further provides a computer program product for implementing the above defined method.

The invention also provides a mobile terminal comprising a wireless interface for receiving signals and providing the signal samples to a receiver as above defined.

The invention further provides a base station for implementing the above defined method.

A further aspect of the invention provides a receiver for use in a wireless cellular network for processing digital samples, the receiver comprising:

a processor arranged to receive a sequence of digital samples corresponding to symbols transmitted in the cell of the wireless network, and for implementing an interference scenario selection routine which uses an identified set of dominant interfering cells above signal level to select an interference scenario, the processor being further operable to implement one of a plurality of processing routines for processing the digital samples;

a memory holding the plurality of processing routines;

wherein the processor implements a selection routine which uses the selected interfering scenario to select one of the plurality of processing routines in the memory for processing the digital samples.

The dominant cells can advantageously be selected from cells detected in a cell search procedure which might be implemented for other purposes, such as handover, where dominant cells are either all detected cells or the set of detected cells emitting a signal above a given threshold.

The described embodiments have the advantage of allowing interference conditions to be identified that require a distinct design for the selection of appropriate receiver parameters and/or signal processing algorithms. Receiver parameters may include the time window to be considered for averaging the collected input samples, which can be selected based on a threshold relative to the estimated Doppler, where a different Doppler threshold value may be chosen depending on the selected interference scenario.

For a given selected interference scenario, the selection of the appropriate receiver parameters and/or signal processing algorithms can be exemplified by a graphical representation where one axis can be used to select an equaliser type based on a parameter related to the serving cell and the interfering cells, which in the preferred embodiment is given by the ratio of the serving cell power to the total interfering power from the dominant interfering cells, and another axis can be use to select an equaliser parameter, such as the time averaging window, based on a detected channel condition such as the maximum Doppler frequency. Each interference scenario would generally have different threshold values, for instance a different threshold for comparison with the ratio between the measured power of the serving cell and the total measured power of the dominant interfering cells.

In an alternative embodiment, the selection of an equaliser function depends on both the power ratio and the estimated Doppler.

Furthermore, the described embodiment allows an effective receiver implementation by re-using neighbour cell measurements already carried out by the user equipment as part of the cell search procedure.

The invention may be applied to any of the situations where an estimate of the specific interference conditions of the wireless terminal can be exploited either at the mobile terminal that performs the cell search for the measurement report or at the base station that receives the measurement report.

BRIEF DESCRIPTION OF DRAWINGS

For a better understanding of the present invention and to show how the same may be carried into effect, reference will now be made by way of example to the accompanying drawings, in which.

DETAILED DESCRIPTION

The following description pertains to the identification of the current interference scenario in a wireless cellular receiver, based on information on the power transmitted from the neighbouring cells.

In particular, the information collected from the neighbouring cell measurements is used to determine the total number of dominant interference cells and thence to compute the total dominant inter-cell interference power (which may or may not coincide with the total detected inter-cell interference power). A different receiver signal processing algorithm is then assigned depending on the number of dominant cells and the relative measure of the serving cell compared with the total dominant interference cell power.

The assigned interference scenario, i.e., the number of dominant interfering cells, can then be used to select a specific receiver adaptation threshold design for the relevant operation conditions. In one embodiment, the threshold is then compared with a power ratio as described in more detail below to select between an LS and an MMSE equaliser. In an alternative embodiment, the selection of the equaliser depends on the power ratio and an estimated Doppler.

Figure 1:
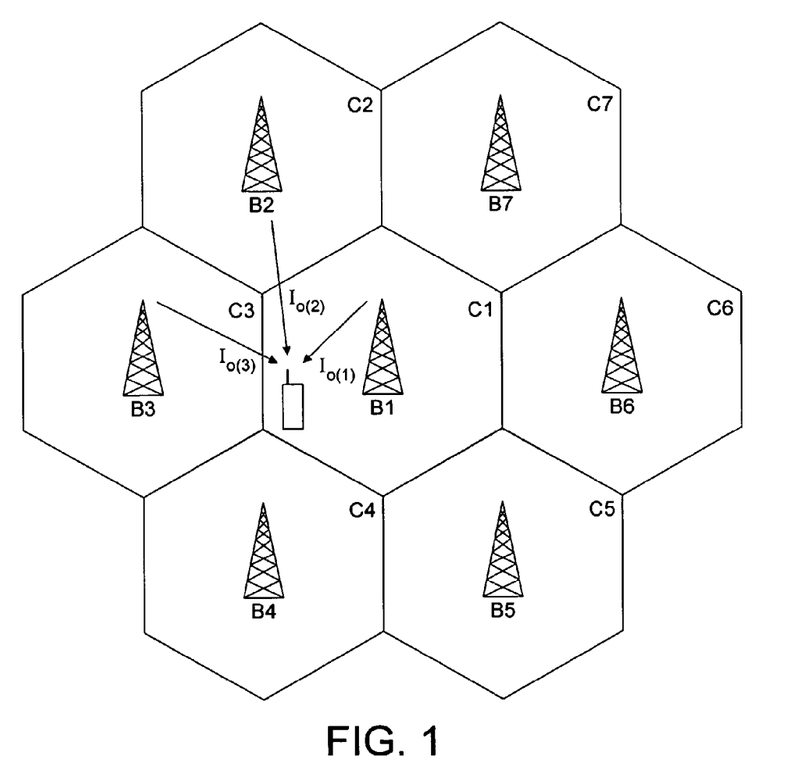
FIG. 1 is a schematic diagram of a wireless cellular network.

FIG. 1 is a schematic diagram of a wireless cellular network. A plurality of adjacent cells is illustrated, shown as being hexagonal but it will be readily appreciated that they could be of any shape. A base station B1 is shown transmitting in cell C1 and potentially interfering with cells C2, C3, ..., C7, with base stations B2, B3, ..., B7, respectively. It will readily be appreciated that there can be a large plurality of base stations and cells, and that base stations can provide transmission over any number of cells (including one).

A mobile terminal or user equipment UE is shown in cell C1. As is well known, the UE has a transmitter and a receiver for wireless signals. The main signal which the UE is intending to receive is labelled $I_{o(1)}$ to represent the downlink channels from the serving base station B1. In a WCDMA system, on a given cell, different physical channels are multiplexed in the code domain using separate spreading sequences (OVFS codes as described for example in the 3GPP specification TS 25.213, "Technical Specification Group Radio Access Network; Spreading and Modulation (FDD)", March 2006). In the case of orthogonal spreading code words, the original data symbols can then be effectively separated at the receiver by despreading. The composite signal transmitted from the base station B1 consists of the superposition of these physical channels further modified by multiplication by a pseudo-random scrambling code, which is unique (at least locally) to the cell. This composite signal is received at the user equipment UE after passing through a transmission channel which, if significant multipath components are present, generally results in a loss of orthogonality that produces multiple-access interference (MAI). The received signal is further corrupted by the addition of thermal noise and transmissions from other cells (for example $I_{o(2)}$ and $I_{o(3)}$). Due to lack of synchronisation and use of different scrambling codes, these interfering signals are not orthogonal to the wanted cell transmissions.

Each cell in the wideband CDMA system transmits a special constant power downlink channel known as the common pilot channel (CPIPH) on a fixed OVSF code (as discussed for example in the 3GPP specification TS 25.211, "Technical Specification Group Radio Access Network; Physical Channels and Mapping of Transport Channels onto Physical Channels (FDD)", December 2005). The CPICH is transmitted with a fixed, predetermined data pattern and can be used for channel estimation and signal-to-interference ratio (SIR) estimation.

Figure 2:
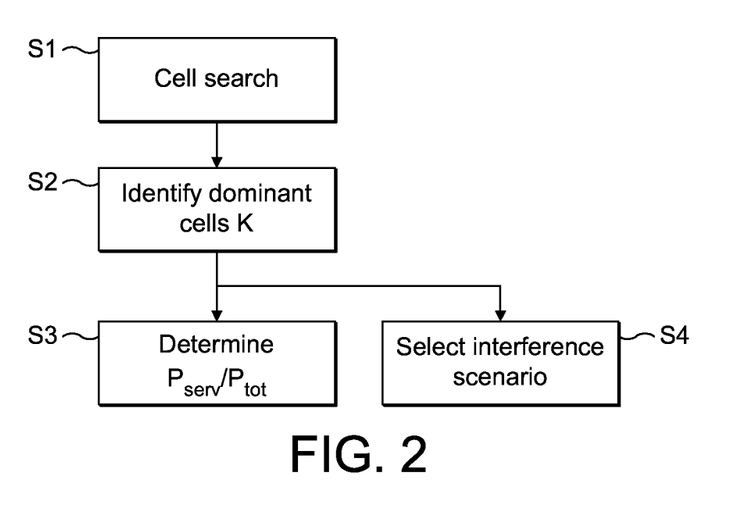
FIG. 2 is a schematic flow chart showing operation of a method of estimating an interference scenario including the derivation of the ratio of the serving cell power to the total interfering power from the dominant interfering cells.

FIG. 2 is a schematic flow diagram showing a function for estimating an interference scenario, including the derivation of the ratio of the serving cell power to the total interfering power from the dominant interfering cells.

In an embodiment of a WCDMA/HSDPA receiver described herein, the identification of the current interference scenario is based on the neighbouring cells measurements carried out during a cell search, S1. In particular, the algorithm for identification of the interference scenario makes use of a cell search table containing the powers $P_k$, k=1, ..., N of all detected cells, excluding the serving cell. More specifically, the search result gives the power of the CPICH of each cell, which we assume is a constant portion of the total cell power.

A detected cell is a cell that has satisfied the detection criteria to be included in the cell database.

Denote by K the number of dominant interfering cells within a predefined time period. The number of dominant cells is identified by comparing the detected cell signals with a level. The invention applies where the dominant cells coincide with the detected cells and also in a case where the dominant cells are a subset of the detected cells.

The number of dominant interfering cells K is identified in S2.

The total inter-cell interference power is defined in S3 as $$P_{tot} = \sum_{k=1}^{K} P_k.$$

Denote the serving cell power by $P_{serv}$, and determine (S3) the ratio of the serving cell power to the total detected cell interference power $P_{serv}/P_{tot}$. The number of dominant interfering cells K is used to determine the interference scenario (S4), which as we will describe below determines the threshold design, including a threshold value for the estimated $P_{serv}/P_{tot}$.

Figure 3:
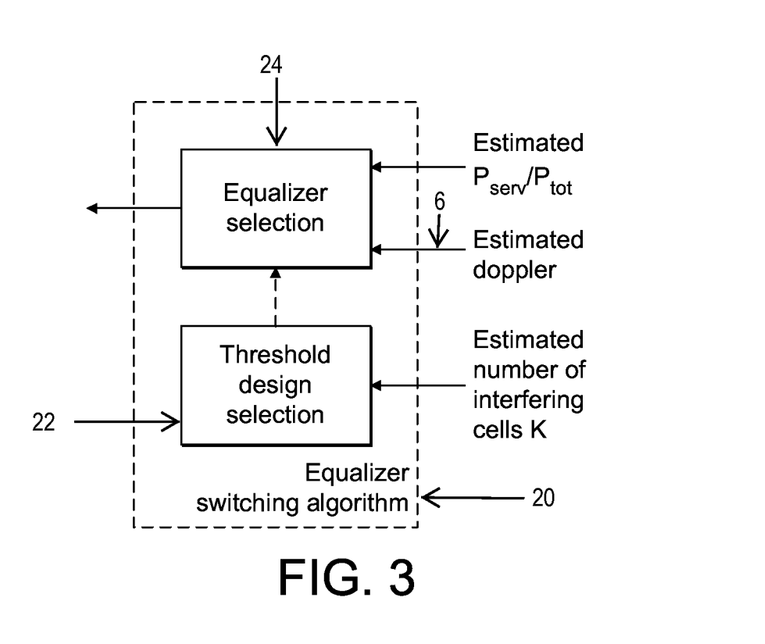
FIG. 3 is a block diagram of the procedure for the selection of the appropriate equalizer parameters and/or equalizer signal processing algorithm.

As shown in FIG. 3, the number of dominant cells K (i.e., the selected interference scenario) is supplied to an equaliser switching algorithm function 20. The function 20 can also receive other inputs from other channel parameter estimation functions of the type which can be used to select equaliser implementations. Such parameters include, for example, Doppler frequency estimates 6. The number K is supplied to a threshold design selection function 22 in the equaliser switching algorithm function 20. The output of the threshold design selection function 22 is supplied to an equaliser selection function 24 which also receives as inputs the ratio $$\frac{P_{serv}}{P_{tot}}$$

and the estimated Doppler function 6. It will readily be appreciated that there may be other inputs to the equaliser selection function 24, for example, of the type described in International Application Publication No. WO 2009/056500. The output of the equaliser selection function 24 which represents a selected equaliser implementation which is most suited to the interference scenario which is being determined is then used in the receiver for processing received signal samples. The equaliser implementation can be selected in hardware, but it is more likely and more advantageous that it will be selected by selecting a particular code sequence to be executed on a processor in a so-called soft modem environment.

In general terms, with a value of K equal to 1, we determine that the interference scenario is very suited to the use of a LS equaliser (or alternative interference rejection or interference cancellation algorithms), for most values of $P_{serv}/P_{tot}$. Correspondingly, the interference scenario defines a relatively high threshold $\theta$ for the value of $P_{serv}/P_{tot}$ above which the interference scenario is not suited to the use of an LS equaliser (or alternative interference rejection or interference cancellation algorithms).

Given a value of K, the ratio $P_{serv}/P_{tot}$ is compared with the threshold $\theta$—below the threshold, an LS equaliser or equivalent would be selected, where above the threshold an MMSE equaliser would be selected. Note however that, as will be described below, depending on the particular embodiment, the equaliser selection may depend not only on the ratio $P_{serv}/P_{tot}$, but on the ratio $P_{serv}/P_{tot}$ and the estimated Doppler.

As K increases, the suitability to interference cancellation progressively decreases, and hence the defined threshold value $\theta$ for comparison with $P_{serv}/P_{tot}$ decreases.

If K equals zero, then we can determine that we have purely AWGN like interference, typical of a laboratory situation where the interference of many cells is modelled by an AWGN source. This situation is unsuited to the use of a LS equaliser (or alternative interference rejection or interference cancellation algorithms). In this case we can either use a very low threshold θ, or more simply directly select an MMSE equalizer.

In a real world situation, undetected cells are likely to comprise a proportion of the total interference power and yet be undetected because they are of low level. Nevertheless, from the study of typical interference distribution presented in the 3GPP document TR 25.963 v8.0.0, "Feasibility Study on Interference Cancellation for UTRA FDD User Equipment (UE)", December 2008, the strongest interfering cell typically accounts for about 40-50% of the total interference power, and the two strongest interfering cells for about 60-70% of the total interference power. This implies that it is rare to get many low level undetected cells and no strong interferer, which implies that the above algorithm is robust in real world situations.

Laboratory testing of the LS equaliser (or of alternative interference rejection or interference cancellation algorithms) is likely to only include a small number of interfering cells and a proportion of AWGN. However, even in this situation, the ratio $P_{serv}/P_{tot}$ will still give a clear indication of a scenario requiring the use of a LS equaliser (or alternative interference rejection or interference cancellation algorithms) using the same metric as for the real world situation.

Furthermore, applying a filter to the value K and the individual quantities $P_{serv}$ and $P_{tot}$ makes it is possible to remove any effects of false alarms from the cell detection algorithm.

There follows a more specific discussion of the use of the selected interference scenario for the selection of the appropriate receiver implementation.

Interference Scenario A—One Dominant Interfering Cell (K=1)

Figure 4:
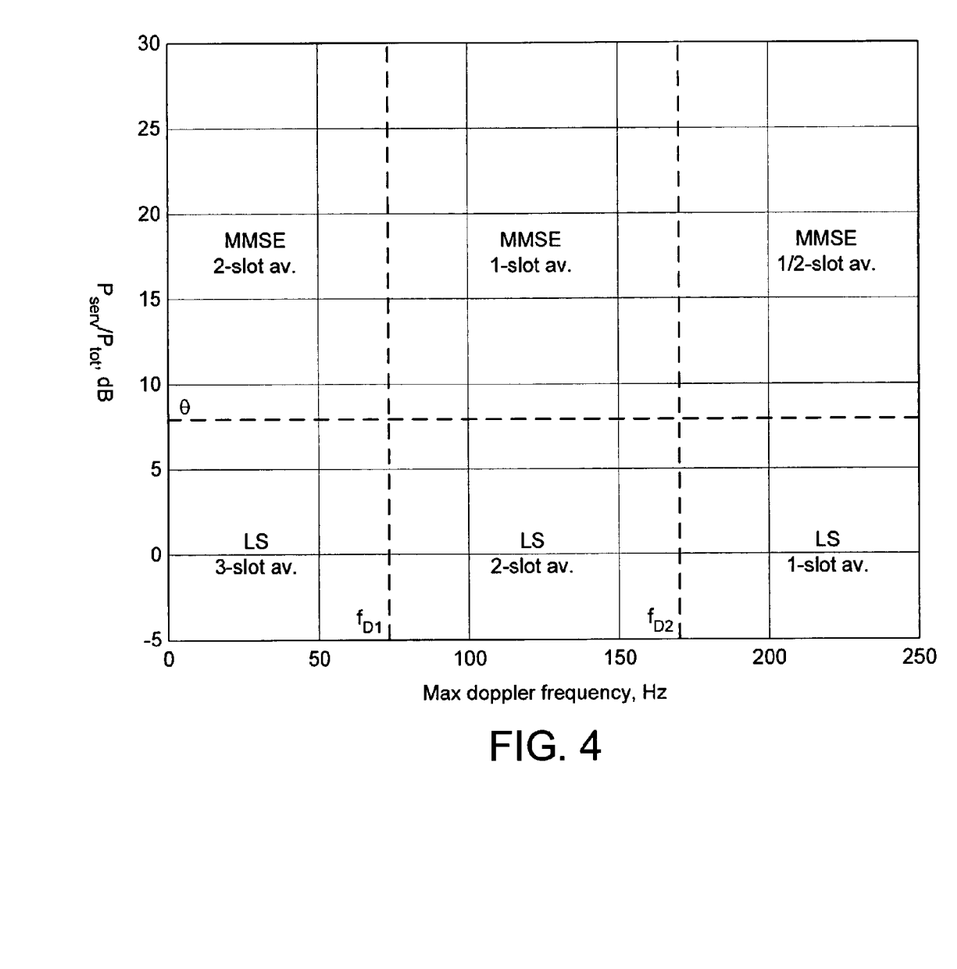
FIGS. 4 and 5 are graphical representations of a typical implementation of the selection of the appropriate equalizer parameters and/or equalizer signal processing algorithm, for two out of the number of considered interference scenarios.
Figure 6:
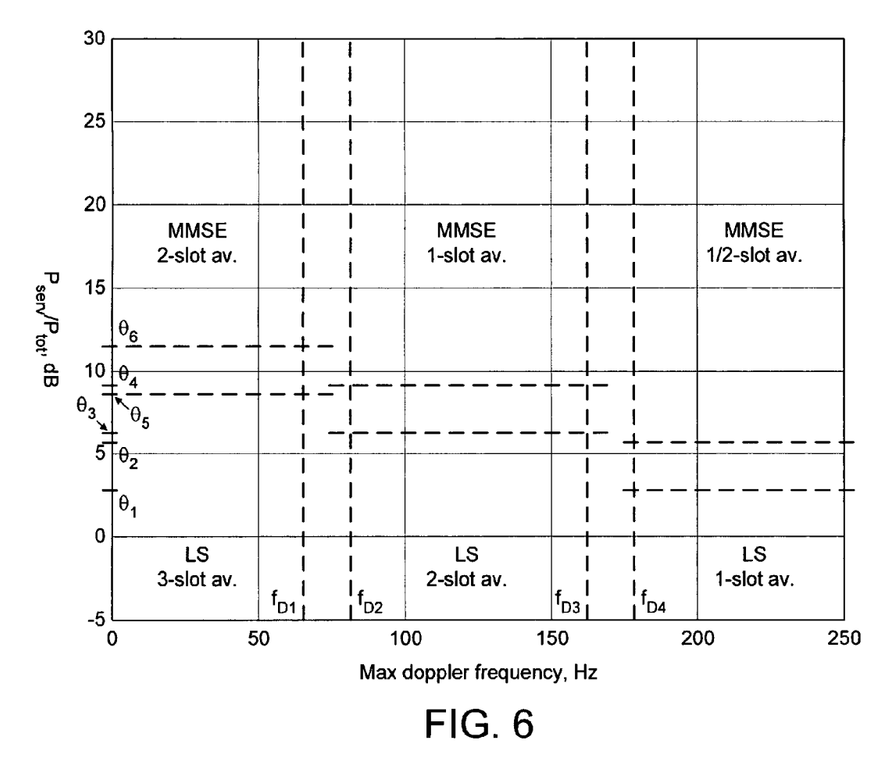
FIGS. 6 and 7 are graphical representations of an alternative implementation of the selection of the appropriate equalizer parameters and/or equalizer signal processing algorithm, for two out of the number of considered interference scenarios.

In the case where the interference scenario is identified as one dominant interfering cell (K=1), the equaliser switching algorithms selects the appropriate equaliser implementation based on both the estimated ratio $P_{serv}/P_{tot}$ and the estimated Doppler. The equaliser selection is initialized to the 1-slot average MMSE equaliser. As shown in FIG. 4, in each of the three regions of low Doppler, medium-high Doppler and very high Doppler, the algorithm will select between one MMSE equaliser and one LS equaliser implementation depending on the estimated ratio $P_{serv}/P_{tot}$, based on comparison with the threshold value θ. In the alternative implementation of FIG. 6, in each of the three regions of low Doppler, medium-high Doppler and very high Doppler, the algorithm will select between one MMSE equaliser and one LS equaliser implementation depending on the estimated ratio $P_{serv}/P_{tot}$, based on comparison with threshold values $θ_1$-$θ_6$ which vary depending on the Doppler estimate. In FIG. 6 the different thresholds are implemented with hysteresis, i.e., with different thresholds values when changing state in opposite directions.

Interference Scenario B—Two Dominant Interfering Cells (K=2)

Figure 5:
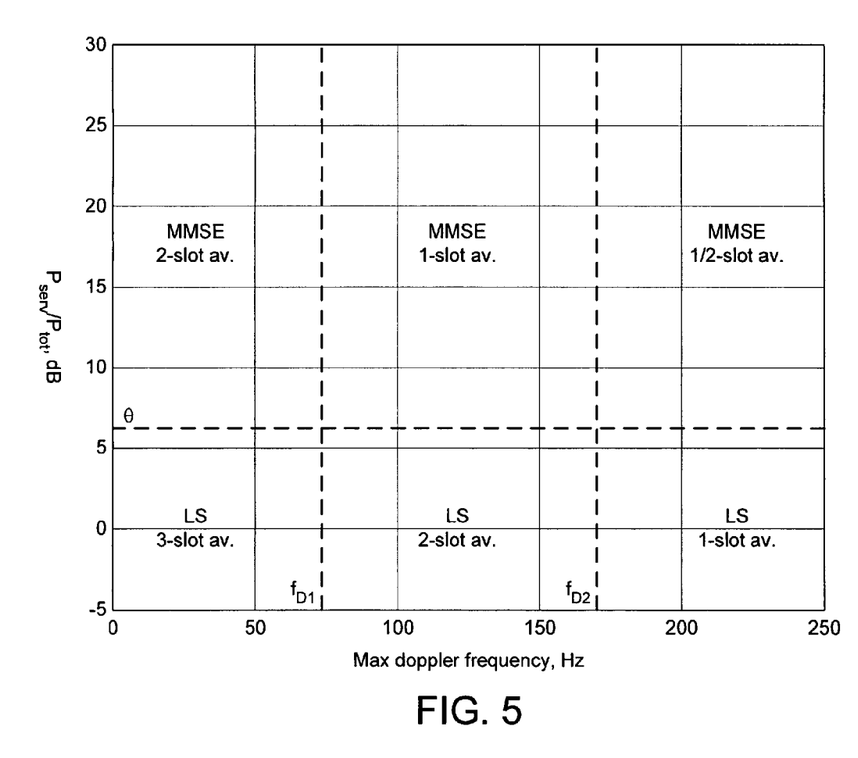
Figure 7:
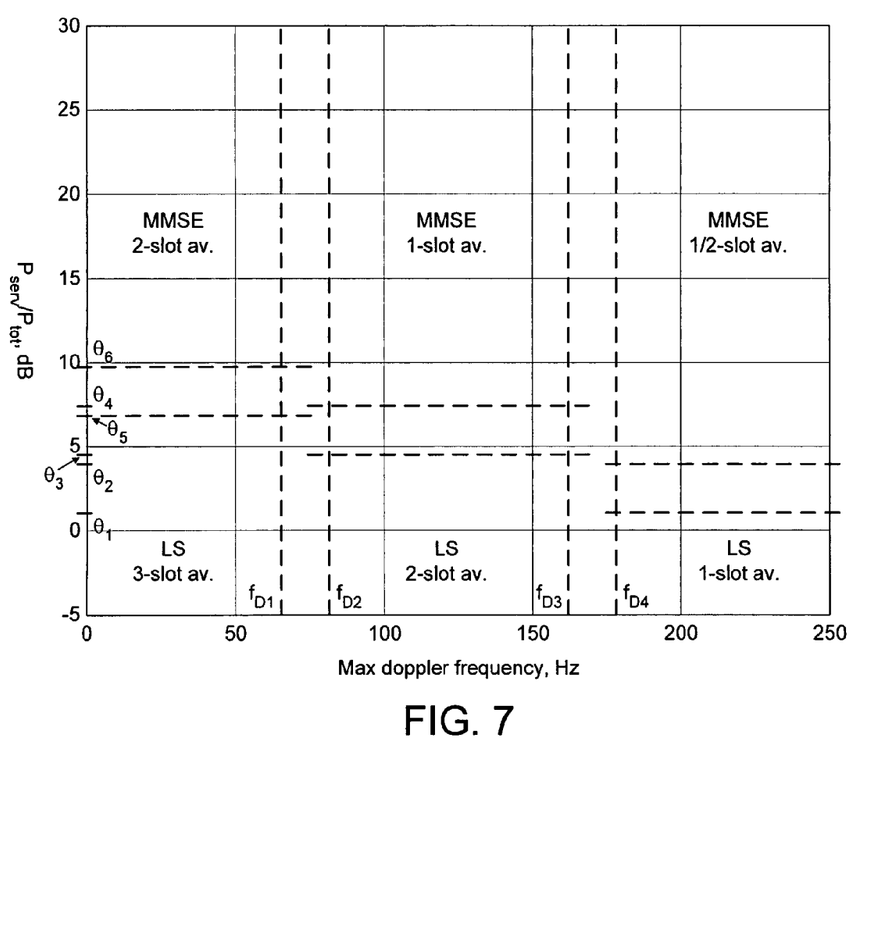

In the case where the interference scenario is identified as two dominant interfering cells (K=1), the equaliser switching algorithms selects the appropriate equaliser implementation based on both the estimated ratio $P_{serv}/P_{tot}$ and the estimated Doppler. The equaliser selection is initialized to the 1-slot average MMSE equaliser. As shown in FIG. 5, in each of the three regions of low Doppler, medium-high Doppler and very high Doppler, the algorithm will select between one MMSE equaliser and one LS equaliser implementation depending on the estimated ratio $P_{serv}/P_{tot}$, based on comparison with the threshold value θ. In the alternative implementation of FIG. 7, in each of the three regions of low Doppler, medium-high Doppler and very high Doppler, the algorithm will select between one MMSE equaliser and one LS equaliser implementation depending on the estimated ratio $P_{serv}/P_{tot}$, based on comparison with threshold values $θ_1$-$θ_6$ which vary depending on the Doppler estimate. In FIG. 7 the different thresholds are implemented with hysteresis, i.e., with different thresholds values when changing state in opposite directions.

Interference Scenario C—Three Dominant Interfering Cells (K=3)

In the case where the interference scenario is identified as three dominant interfering cells (K=3), the equaliser switching algorithms selects the appropriate equaliser implementation based on both the estimated ratio $P_{serv}/P_{tot}$ and the estimated Doppler. The equaliser selection is initialized to the 1-slot average MMSE equaliser. The operation differs from the case of interference scenarios A and B in the values of the different thresholds employed for the selection of the appropriate receiver implementation.

The above example is limited to two or three dominant interfering cells only to simplify the description of the algorithm, while a typical practical implementation may advantageously consider interference scenarios with more than three dominant interfering cells.

Note that in FIG. 5 (FIG. 7) the $P_{serv}/P_{tot}$ thresholds are lower than the equivalent thresholds in FIG. 4 (FIG. 6). More specifically, the threshold value θ in FIG. 5 ($θ_1$-$θ_6$ in FIG. 7) is lower than the threshold value θ in FIG. 4 ($θ_1$-$θ_6$ in FIG. 6), reflecting the fact that the use of the LS equaliser (or of alternative interference rejection or interference cancellation algorithm) is more important even at lower levels of total interference $P_{tot}$ in an interference scenario with a lower number of dominant interfering cells.

It will be appreciated that the implementing means discussed above, e.g., the determining means and the comparing means can be implemented in any suitable manner in hardware or software. In the latter case they can be implemented by executing in a processor code sequences shared in a memory.

The invention claimed is:

1. A base station comprising a wireless interface for receiving and transmitting signals, said base station operable to implement a method of processing a signal received using a wireless communication channel by a receiver in a wireless cellular network, the method comprising:
   receiving signal samples of a signal to be processed from a serving cell;
   identifying a set of dominant interfering cells generating an interfering signal above a level;
   using the number of cells in the set to select an interference scenario; and
   using the selected interference scenario and at least one parameter related to the serving cell and the interfering cells to select a processing function for processing the signal.

2. A base station according to claim 1, the method further comprising:
   determining from the signal samples a serving cell power for the signal;
   determining the total interference power from the cells in the set, and comparing the ratio of the serving cell power and the total disturbance power with a threshold value defined by the selected interference scenario to select the processing function.

3. A base station according to claim 2, wherein the threshold value varies with the number of dominant cells.

4. A base station according to claim 2, wherein the ratio is used to select an Equalizer type in dependence on the threshold value.

5. A base station according to claim 4, wherein the selection also depends from the value of at least one additional channel parameter.

6. A base station according to claim 4, wherein the equalizer type is selected from an LS equalizer and an MMSE equalizer.

7. A base station according to claim 1, wherein the processing function is an Equalizer function.

8. A base station according to claim 7, wherein an Equalizer parameter for the Equalizer is determined based on at least one estimated channel condition.

9. A base station according to claim 8, wherein the Equalizer parameter is the time averaging interval.

10. A base station according to claim 8, wherein the channel condition is an estimate of the relative mobile speed.

11. A base station according to claim 1, wherein the number of dominant cells is selected from a group of cells detected by a cell search function.

12. A receiver for use in a wireless cellular network for processing signal samples, the receiver comprising:
a processor configured to receive signal samples, identify a set of dominant interfering cells generating an interfering signal above a level, select
an interference scenario using the number of cells in set and
select a processing function for processing the signal samples based on the selected interference scenario and at least one parameter related to the serving cell and the interfering cells; and
a memory storing said processing function.

13. A receiver according to claim 12, wherein said memory further stores a plurality of Equalizer functions, wherein the selected interference scenario is used to select one of said Equalizer functions as said processing function.

14. A receiver according to claim 13, wherein the Equalizer functions include LS and MMSE Equalizers.

15. A receiver according to claim 12, wherein the processor is further configured to determine
from the signal samples a serving cell power for the signal, determine
the total interference power from the cells in the set and
compare the ratio of the serving cell power and the total disturbance power with a threshold value defined by the selected interference scenario to select the processing function.

16. A mobile terminal comprising a wireless interface for receiving signal samples and providing said signal samples to a receiver in accordance with claim 12.

17. A receiver for use in a wireless cellular network for processing digital samples, the receiver comprising:
a processor arranged to receive a sequence of digital samples corresponding to symbols transmitted in the cell of the wireless network, and for implementing an interference scenario selection routine which uses an identified set of dominant interfering cells above signal level to select an interference scenario, said processor being further operable to implement one of a plurality of processing routines for processing the digital samples;
a memory holding said plurality of processing routines;
wherein the processor implements a selection routine which uses the selected interfering scenario to select one of the plurality of processing routines in the memory for processing the digital samples.

18. A receiver as recited in claim 17 wherein said receiver is a mobile terminal.

19. A receiver as recited in claim 17 wherein the number of dominant cells is selected from a group of cells detected by a cell search function.

* * * * *